Jan. 15, 1935.  K. HENRICHSEN  1,988,079
AIRPLANE WING
Filed May 27, 1932  3 Sheets-Sheet 1
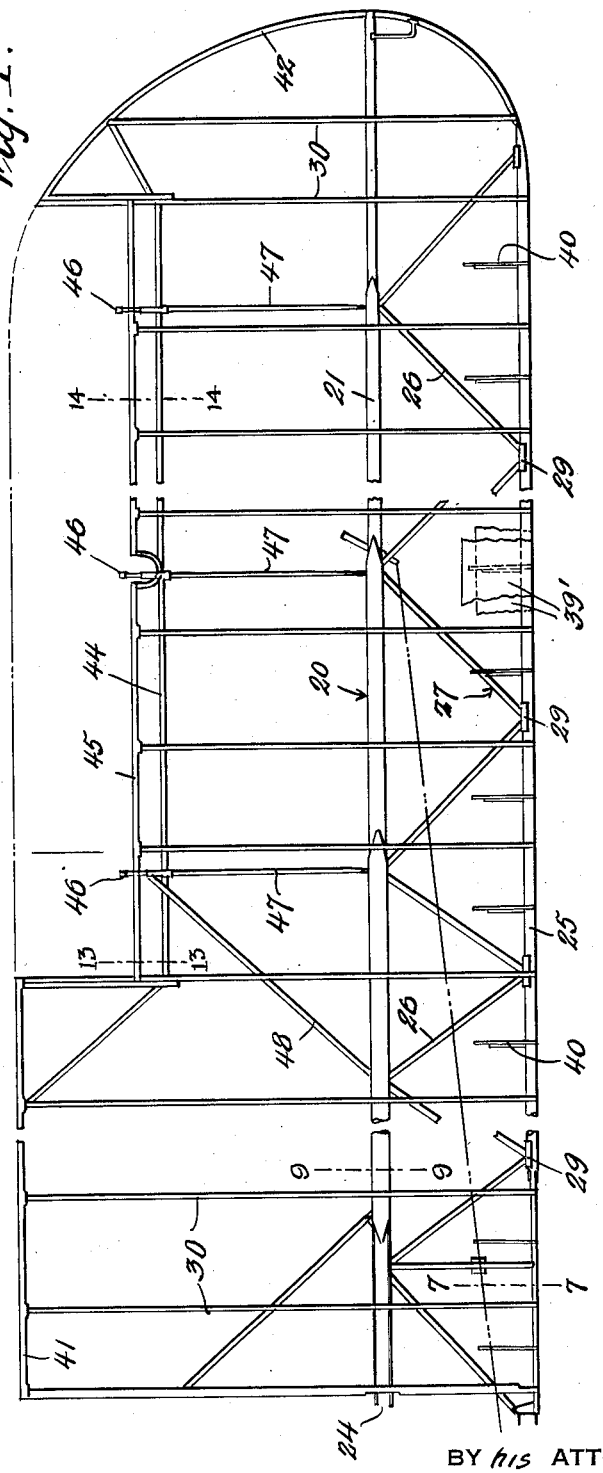
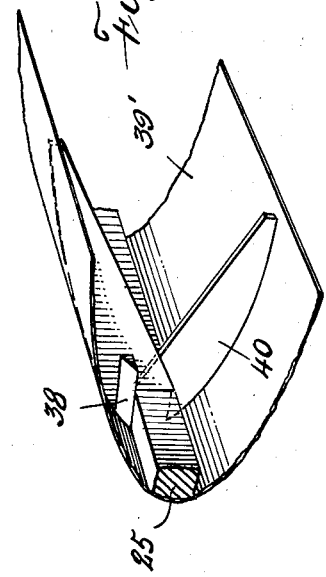
INVENTOR
KNUT HENRICHSEN
BY his ATTORNEY INVENTOR.
KNUT HENRICHSEN
BY his ATTORNEY

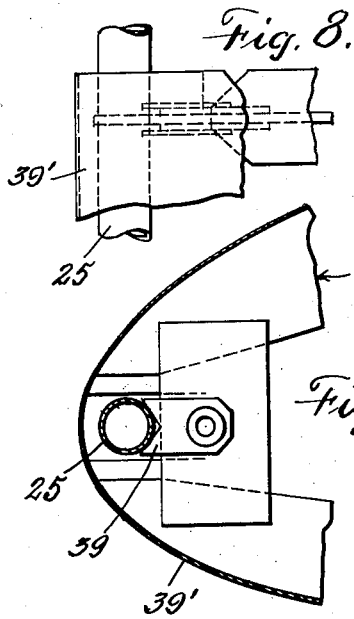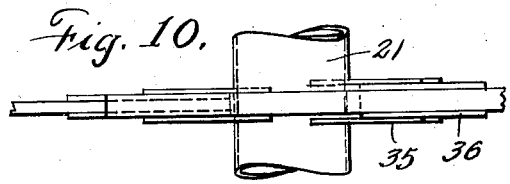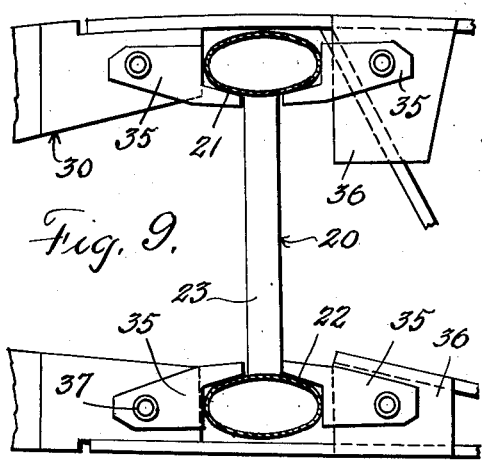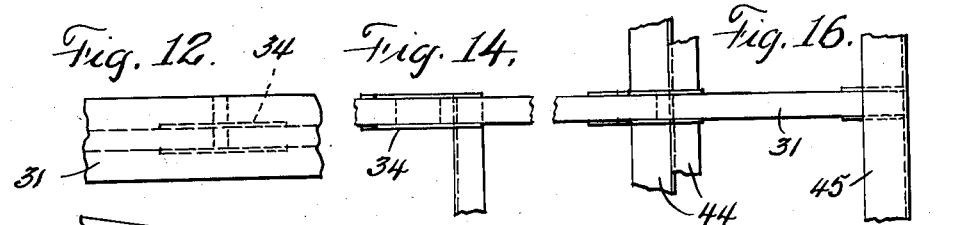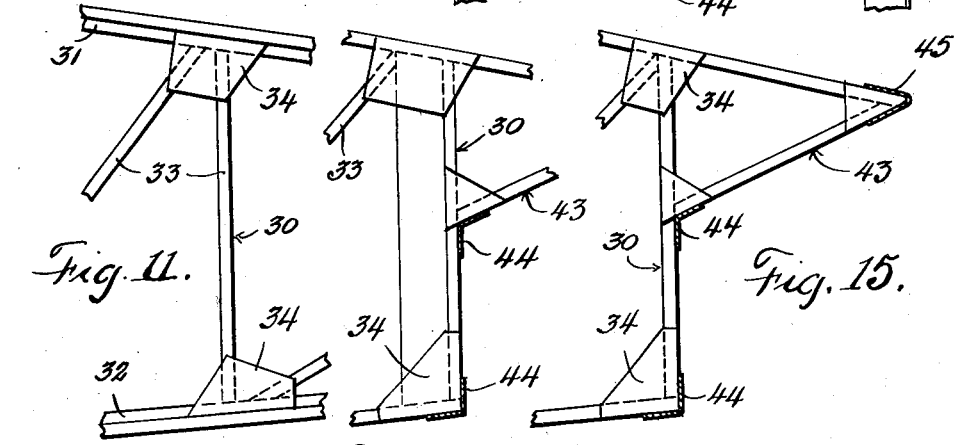

Patented Jan. 15, 1935

1,988,079

UNITED STATES PATENT OFFICE 1,988,079

AIRPLANE WING

Knut Henrichsen, Hartford, Conn., assignor to Curtiss-Wright Airplane Company, a corporation of Missouri Application May 27, 1932, Serial No. 613,804

13 Claims. (Cl. 244—31)

My invention relates to aircraft and more particularly to improvements in airplane wing structures of the so-called monospar type.

The two or multi-spar truss arrangement heretofore used in airplane wing structures is, in the present invention, entirely replaced by a single built-up triangular girder occupying the leading edge of the wing from the nose back to approximately thirty percent (30%) of the chord. In designing a single or monospar wing of any type, an important consideration is the selection of a proper aerofoil section or profile. It is at once obvious that the difficulties in design would be greatly increased by the use of an aerofoil whose center of pressure travel varies within wide limits. The section selected for the wing of the present invention is known as the "CR–2" and has a pronounced S-shaped median line. For this type wing section the maximum center of pressure travel is less than four percent (4%) of the chord length. Under such circumstances the efficiency of a monospar wing approaches the optimum condition, altho other wing sections with greater or less center of pressure travel can be used with satisfactory results.

In cross-section the three main members of the girder form an isosceles triangle whose apex is at the leading edge and whose base lies in a plane perpendicular to the wing chord about thirty percent (30%) back from the leading edge. The two base members of the girder are preferably made up of metal tubing of elliptical shape in cross-section and are progressively reduced in cross-sectional area from root to tip. The beam at the leading edge is supported from the two main members thru a system of diagonal bracing tubes. All ribs and aileron hinge supports are cantilevered aft of the main girder. The aileron supports, as well as all members of the girder (except the leading edge member) are of metal, welded at the joints. The ribs, the leading edge member, nose formers, and leading edge cover stripping, are preferably of wood. A wing thus characterized permits not only a saving in weight but is more economical of construction than wing structures of conventional design. Moreover, the attachment of the wing to the fuselage is simplified as only one major bulkhead is required in the latter to take the greater portion of the lift loads. Other and further advantages of a monospar type wing structure such as that herein disclosed will be noted hereinafter.

In the drawings:

Fig. 1 is a plan view of the wing with its outer fabric or other form of covering entirely removed. In this figure the leading edge stripping is shown broken away, whereas the trailing edge of the inset aileron is indicated by a dot and dash line;

Fig. 6 is a perspective view of a portion of the nose stripping showing the manner in which certain of the ribs are fastened to the leading edge beam;

Fig. 7 is an enlarged section on the line 7—7 of Fig. 1;

Fig. 8 is a fragmentary plan view of the structure illustrated in Fig. 7;

Fig. 9 is an enlarged section on the line 9—9 of Fig. 1;

Fig. 10 is a fragmentary plan view of the structure illustrated in Fig. 9;

Fig. 11 is a fragmentary side elevation of a portion of one of the ribs at or near the inner end of the wing;

Fig. 12 is a plan view of the structure illustrated in Fig. 11;

Figs. 13 and 14 are enlarged sections on the lines 13—13 and 14—14 of Fig. 1; and Figs. 15 and 16 are plan views of the structures illustrated respectively in Figs. 13 and 14.

In the embodiment of the invention selected for illustration only the skeleton frame of the wing is shown. It is to be understood that a suitable covering, either fabric, metal, or veneer, completely envelopes said frame and that said frame at its inner end is suitably hinged or fastened either to the inner end of an oppositely extending similarly constructed wing or to the side of the airplane fuselage or body.

Unlike previously designed wings or supporting surfaces, the skeleton frame of the wing herein illustrated comprises but a single main spar or lattice beam 20. Said spar 20 is preferably of substantial depth and lies approximately thirty percent (30%) of the chord length back from the leading edge of the wing and, as previously intimated, is used to advantage in association with wings having a profile such that the center of pressure travel is reduced to a minimum.

Figure 3:
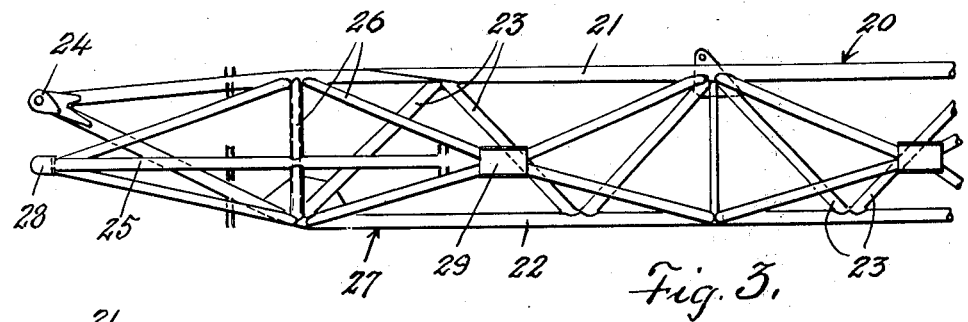
Fig. 3 is a front end elevation of the structure illustrated in Fig. 2.
Figure 4:
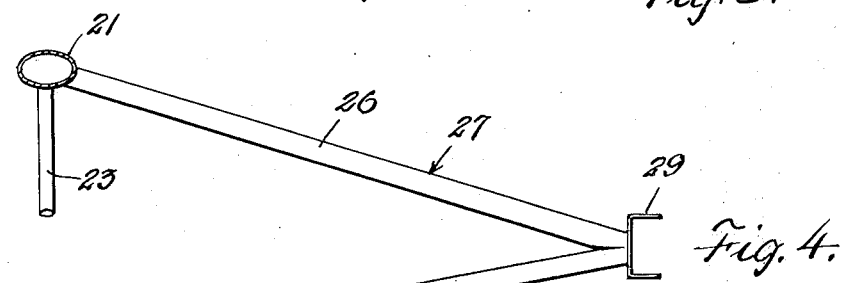
Fig. 4 is an enlarged section on the line 4—4 of Fig. 2.

The main spar 20 (see Fig. 3) comprises a top chord 21, a bottom chord 22, and connecting vertical and diagonal web members 23. At the opposite ends of the beam the chord members 21—22 thereof are brought together, and at one end of the beam the chord members are united by a suitable hinge fitting 24. Preferably the chord members are hollow, of elliptical section, and of progressively decreasing cross-sectional area from root to tip.

The disposition of the lattice beam 20 in its relation to the wing is such that it provides in association with the leading edge beam 25 and connecting diagonals 26 the base of a triangular longitudinally extending girder 27. Said girder 27 is coextensive with the wing and in actual use carries substantially the entire wing load. A second hinge fitting 28 is provided at the inner end of the leading edge beam 25.

The connecting diagonals 26 are also of hollow section. From the main spar 20 they extend alternately inwardly at an angle and outwardly at an angle, and each at its forward end is fastened to the leading edge beam 25. The beam 25 throughout the inner end portion of its length is of hollow section (metal), whereas throughout the outer end portion of its length it is of solid section (wood). Collectively the diagonals 26 provide longitudinally of the beam 20, a series of forwardly extending substantially pyramidal supports at the apex of each of which a channel clip 29 is fastened as by welding. Within the channels thus provided the wood or solid portion of the leading edge beam or chord member 25 is fitted. It will be readily appreciated that, through the arrangement of the chord members 21, 22 and 25, with the bracing members 23 and 26, the resultant girder 27 may not only assume the lift and landing loads imposed on the wing, but also will assume all the drag and anti-drag loads imposed thereon. The chord members 21 and 22 assume the principal lift and landing stresses, while the combination of the chord members 21 and 22 with the beam 25, along with the diagonal bracing, makes a highly effective truss for the assumption of drag, anti-drag and torsional loads.

Figure 2:
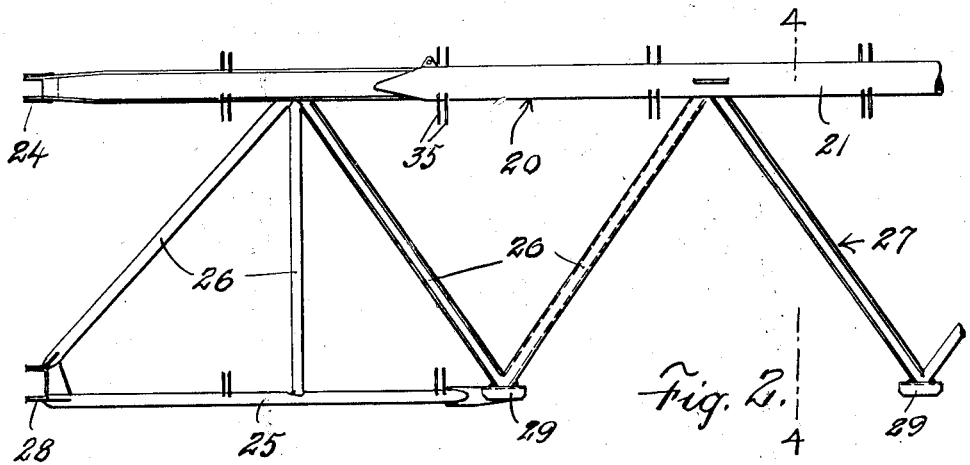
Fig. 2 is a plan view of the inner end of the girder structure. In this view the leading edge beam, except for the inner end metal portion thereof, is omitted.

In addition to the progressively decreasing cross-sectional area of the chords of the beam 20 toward the wing tips, the diagonal web members 23 and the diagonals 26 are of different size in cross-section depending upon the extent to which each is stressed. Beginning at the root of the wing, the diagonals 26 vary in size. For instance, the inner end diagonal 26 fastened to the top chord 21 of the beam 20 is larger in size than the corresponding diagonal fastened to the lower chord 22. This condition prevails as the pairs of diagonals approach the wing tip except that the difference in size is alternately reversed, that is to say, instead of the upper next diagonal being larger than the corresponding lower diagonal, it is smaller (see Fig. 2). Thus arranged and proportioned maximum girder strength with minimum girder weight is obtained.

That the wing may be accorded a given profile, a plurality of ribs 30 are provided. The ribs at the extreme ends of the wing extend from its leading to its trailing edge. Those intermediate the ends of the aileron terminate short of the trailing edge. The aileron (not shown) is preferably inset in the usual manner. Its trailing edge is indicated by the dot and dash line of Fig. 1. Each rib is preferably constructed of wood and is made as light as possible, consistent with adequate strength. The details of the rib construction are best illustrated in Figs. 7 to 16, inclusive. In Fig. 11 the construction of one of the inner end full length ribs is shown. Preferably said inner end ribs comprise top chord members 31, bottom chord members 32, suitable verticals and diagonals 33, and suitable metal gussets 34 for fastening the verticals and diagonals to the rib chords 31—32.

Figure 5:
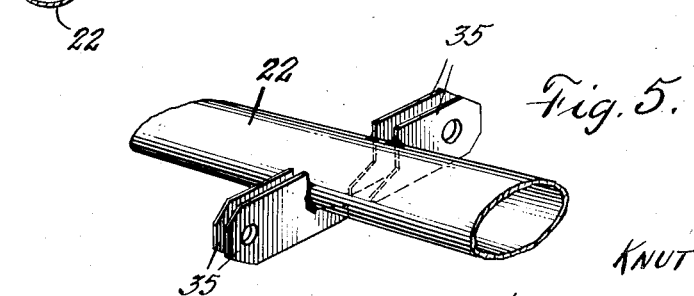
Fig. 5 is a perspective view of one of the metal rib clips or attachment fittings.

Intermediately of their ends the ribs are fastened to the chords 21—22 of the main spar 20. Along its length the spar 20 has welded thereto a plurality of pairs of rib attachment plates or fittings 35—35. Said pairs of plates are directly fastened to the chords of the spar (see Fig. 5) and are so spaced as to receive between them suitable gussets 36 carried by the chords of the ribs. Hollow rivets 37 extending both through plates 35 and the gussets 36 tie the ribs to the beam fittings.

At their forward ends, the ribs are carried beyond the beam 20 and are fastened directly to the leading edge beam 25. Where the beam 25 is solid, the rib chords are fastened thereto as indicated in Fig. 6. Where the beam is hollow, the rib chords are fastened thereto as indicated in Fig. 7. Corner blocks 38 are used in the first instance to secure the desired fastening, whereas gussets 39 welded to the metal portion of the beam 25 are used in the latter instance to fasten the rib ends in place. Throughout substantially its entire length the leading edge of the wing is reinforced and rounded off by the provision of nose stripping 39 of channel section (see Fig. 6), within the channel of which the beam 25 and the rib ends are received. False ribs 40, intermediately located between the main ribs are provided to give added strength at the nose of the wing.

The ribs, in effect, are cantilevered aft of the girder 27. No rear wing beam or spar is provided. At their rear ends, except for the aileron length, the ribs at the inner end of the wing are fastened to a metal trailing edge strip 41, and at the outer end thereof are fastened to a suitable curved or bowed outer end strip 42. Those ribs extending rearwardly from the girder intermediately of the ends of the aileron terminate abruptly (see Figs. 13 and 15) to provide in effect a suitable overhang 43 beneath which the leading edge of the aileron is fitted. Thus constructed, a so-called "Friese" aileron can be used. To strengthen the wing throughout its abruptly terminating portion angle strips 44 and 45, coextensive with the aileron, are provided. Said strips, like the trailing edge strip 41, hold the rear rib ends in the desired spaced relation.

The ailerons (not shown) have a hinge connection with the wing frame. The hinge supports 46, three in number, like the ribs of the wing, are cantilevered aft of the main beam or girder. They are not, as is usually the case, fastened to a rear beam or spar. Instead, all aileron loads are carried directly to the girder 27 through appropriate rearwardly converging metal tubes 47 fastened to the main beam and carrying at their outer ends, the hinge supports. If desired, the pairs of tubes 47 at the inner end of the aileron may be laterally braced as at 48.

From the above, it is obvious that a strong though light wing framing has been evolved. The conventional two-spar or multi-spar arrangement has been entirely eliminated. There is used instead a single built-up trinagular girder occupying the leading edge of the wing and back from which all ribs as well as the aileron supports are cantilevered.

While I have described my invention in detail in its present preferred embodiment, it will be obvious to those skilled in the art after understanding my invention that various changes and modifications may be made therein without departing from the spirit or scope thereof. I aim in the appended claims to cover all such modifications and changes.

What is claimed is:

1. In an airplane wing structure, a main girder having a depth fore and aft substantially equal to and co-extensive with the distance between the leading edge of the wing and the longitudinal vertical plane of the mean center of pressure thereof, and a plurality of ribs carried by and cantilevered aft of said girder to the trailing edge of the wing.

2. In an airplane wing structure, a main girder having a depth fore and aft substantially equal to and co-extensive with the distance between the leading edge of the wing and the longitudinal vertical plane of the mean center of pressure thereof, aileron hinge supports distantly removed from said plane, and means carried by said girder to which said aileron supports are fastened, said last mentioned means including a plurality of cantilevered bracing elements.

3. In an aeroplane wing structure, a forwardly located main girder having a depth fore and aft substantially equal to but not greater than the distance between the leading edge of the wing and the longitudinal vertical plane of the mean center of pressure thereof, a plurality of ribs carried by and cantilevered aft of said girder to the trailing edge of the wing, and aileron hinge supports likewise carried by and cantilevered aft of said girder entirely independently of said ribs.

4. In an airplane wing structure, a main girder having a triangular section with an apex at the leading edge of the wing and a side opposite said apex in substantially the longitudinal vertical plane of the mean center of pressure thereof, said base being removed from said leading edge a distance not greater than one-third of the chord length of the wing as measured from said leading edge, and ribs carried by said girder and cantilevered aft thereof for termination at the trailing edge of the wing.

5. In an airplane wing structure, a main girder of triangular shape in cross-section comprising a lattice beam, a leading edge beam, and diagonals extending from the chords of said lattice beam to said leading edge beam, said lattice beam defining the base of said triangle and being disposed in substantially the longitudinal vertical plane of the mean center of pressure of the wing, said leading edge beam defining the apex of said triangle, and said girder having a depth fore and aft not greater than one-third of the chord length of the wing as measured from said leading edge.

6. In an airplane wing structure, a main girder of triangular shape in cross-section comprising a lattice beam, a leading edge beam, and a plurality of diagonals extending from the chords of said lattice beam to said leading edge beam, said lattice beam being extended lengthwise the wing in substantially the longitudinal vertical plane of the mean center of pressure thereof, and said diagonals being so relatively arranged that adjacent parts of diagonals define forwardly extending pyramids to the apices of which the leading edge beam is fastened.

7. In an airplane wing structure, a lattice beam, a plurality of pairs of diagonals fastened at one end to the respective chords of said beam, said diagonals collectively defining a plurality of forwardly extending pyramidal supports, fittings fastened to said supports at the apices thereof, and a leading edge beam jointly carried by said fittings.

8. In an airplane wing structure, a main girder having a depth fore and aft equal to and co-extensive with thirty percent (30%) of the chord of the wing as measured from its leading edge, and a plurality of ribs fastened to and cantilevered aft of said girder to the trailing edge of the wing.

9. In an airplane wing structure, a single girder comprising a chord member adjacent the leading edge of the wing, a chord member adjacent the upper wing surface, a chord member adjacent the lower wing surface, said latter two chord members lying in a plane substantially normal to the wing chord and spaced rearwardly from said leading edge, and lattice bracing between said three chord members.

10. In an airplane wing structure, a single girder comprising a chord member adjacent the leading edge of the wing, a chord member adjacent the upper wing surface, a chord member adjacent the lower wing surface, said latter two chord members lying in a plane substantially normal to the wing chord and spaced rearwardly from said leading edge, lattice bracing between said three chord members, and rearwardly extending cantilever ribs carried by said girder.

11. In an airplane wing structure, a single girder including three triangularly disposed chord members, one lying adjacent the leading edge of said wing and the other two lying in a plane substantially normal to the wing chord and spaced substantially one-third of the chord length from the leading edge, bracing between said last mentioned chord members whereby said last mentioned chord members assume the lift stresses imposed upon said airfoil, and bracing between said leading edge member and said other chord members whereby all said chord members assume drag and anti-drag stresses.

12. In an airplane wing having an airfoil section wherein the center of pressure travel between high and low angles of attack is relatively small, a single spar disposed substantially vertically in the plane of the mean or average center of pressure of the wing for primarily assuming lifting and landing loads, a chord member adjacent the leading edge of said wing, diagonal bracing extending from said chord member to the upper and lower edges of said spar, said chord member and bracing, in combination with said spar, strengthening said wing against drag, anti-drag and torsional forces imposed thereon, and a relatively light cantilevered portion extending rearwardly from said spar for completing the airfoil section.

13. In an airplane wing having an airfoil section wherein the center of pressure travel between high and low angles of attack is relatively small, a relatively narrow single spar disposed substantially vertically between the limits of center of pressure travel and adapted primarily to assume vertical load forces imposed on said wing, a chord member adjacent the leading edge of said wing, bracing between said chord member and said spar, said chord member in combination with said bracing and spar forming a truss for the assumption of horizontal components of force applied upon said wing, relatively light rib members extending forwardly and rearwardly from said spar conforming in their profile to the airfoil section, and a covering enclosing said chord member, said bracing, said spar and said rib members.

KNUT HENRICHSEN.